United States Patent
Lange et al.

(10) Patent No.: US 7,581,032 B2
(45) Date of Patent: Aug. 25, 2009

(54) SYSTEM AND METHOD FOR ACCESSING DATA IN A DEVICE USING A STANDARDIZED USER INTERFACE

(75) Inventors: Ronald Lange, Fürth (DE); Frank Springer, Hohenstadt (DE)

(73) Assignee: Siemens Aktiengesellschaft, Munich (DE)

( * ) Notice: Subject to any disclaimer, the term of this patent is extended or adjusted under 35 U.S.C. 154(b) by 736 days.

(21) Appl. No.: 10/492,275

(22) PCT Filed: Sep. 26, 2002

(86) PCT No.: PCT/DE02/03647

§ 371 (c)(1), (2), (4) Date: Apr. 8, 2004

(87) PCT Pub. No.: WO03/034163

PCT Pub. Date: Apr. 24, 2003

(65) Prior Publication Data

US 2004/0249834 A1 Dec. 9, 2004

(30) Foreign Application Priority Data

Oct. 8, 2001 (DE) ................................ 101 49 481

(51) Int. Cl.
*G06F 15/16* (2006.01)
(52) U.S. Cl. .................. 709/250; 709/227; 709/228; 709/229; 709/245
(58) Field of Classification Search ......... 709/227–229, 709/245, 250
See application file for complete search history.

(56) References Cited

U.S. PATENT DOCUMENTS

| | | | |
|---|---|---|---|
| 6,438,594 B1 * | 8/2002 | Bowman-Amuah | 709/225 |
| 6,549,214 B1 * | 4/2003 | Patel et al. | 345/660 |
| 6,560,607 B1 * | 5/2003 | Lassesen | 707/101 |
| 7,003,558 B2 * | 2/2006 | Agrusa et al. | 709/223 |
| 7,136,857 B2 * | 11/2006 | Chen et al. | 707/10 |
| 7,181,731 B2 * | 2/2007 | Pace et al. | 717/136 |
| 7,257,821 B2 * | 8/2007 | Wendorf et al. | 719/328 |
| 2001/0047383 A1 * | 11/2001 | Dutta | 709/201 |
| 2002/0138848 A1 * | 9/2002 | Alao et al. | 725/109 |
| 2002/0174178 A1 * | 11/2002 | Stawikowski | 709/203 |

FOREIGN PATENT DOCUMENTS

| | | |
|---|---|---|
| WO | WO 98/53581 | 11/1998 |
| WO | WO 00/76169 | 12/2000 |
| WO | WO 01/22681 A2 | 3/2001 |
| WO | WO 01/57651 A2 | 8/2001 |

* cited by examiner

*Primary Examiner*—Nathan J Flynn
*Assistant Examiner*—Mohamed Wasel

(57) ABSTRACT

System method and computer-readable media are provided for accessing data in a device using a standardized interface Access to data may be obtained by a data processing device by sending a call from a first data processing device to a second data processing device via a data network. The address for identifying the call sender is extracted in the second data processing device and call information may be accessed via the standardized interface through the address extracted in the second data processing device. The second data processing device receives a file containing variables to be requested, replaces the parameters in the file with the corresponding variables of the appliance, and transmits the file with the replaced parameters to the first data processing device.

21 Claims, 4 Drawing Sheets

SYSTEM AND METHOD FOR ACCESSING DATA IN A DEVICE USING A STANDARDIZED USER INTERFACE

CROSS REFERENCE TO RELATED APPLICATIONS

This application is the US National Stage of International Application No. PCT/DE02/03647, filed Sep. 26, 2002 and claims the benefit thereof. The International Application claims the benefits of German application No. 10149481.5 filed Oct. 8, 2001, both applications are incorporated by reference herein in their entirety.

System and method for the data output of a device, especially an automation device via a standardized interface with replacement of variables by means of an echo server.

FIELD OF INVENTION

The invention relates to a system and method for accessing a device, especially an automation device with a standardized interface.

BACKGROUND OF INVENTION

Such a system and method are found for example in the automation technology sector, in production machines, machine tools, etc. In automation technology, uniform interfaces have been adopted for accessing the devices. These interfaces include OPC and PROFInet. The nature of these interfaces always depends on the communication technology used; in the two cases mentioned above this is COM/DCOM. The requirement however is that these interfaces should also be accessible via new communication technologies such as web access.

From DE-A 199 29 933 an automation device for communicating with at least one data processing-device via a data network is known. The automation device has a memory for storing communication data in the form of operating dialogs for operating the automation device and for communicating with a browser in the data processing device and in the form of device information for service and support. The communication data and device information stored in the memory are transferred from the automation device to the data processing device via the data network by means of a standard protocol between the automation device and the browser.

SUMMARY OF INVENTION

The object of the invention is to specify a system and a method for accessing a device that does not require any changes to the device itself and no additional planning of a data processing device connected with the device, with data output from the device possible in a freely selected data format either locally or from a remote location.

Aspects of the present invention are achieved by a method or by a system with the features described in the detailed description.

The invention is based on the knowledge that in previous solutions the device had to be supplemented with a new communication protocol, for example the use of wrappers (i.e. communication converters) on the client or device side, or the use of additional servers (devices), i.e. the wrapper is relocated to a separate device. Typically, however, project planning is required for this server (e.g. which subordinate devices are there). If the system is expanded or modified the project planning for the server must therefore also be adapted.

One of the reasons why project planning is needed is that there is no uniform access interface to the devices. For each new device, therefore, the access interface (communication protocol, method signature, . . . ) has to be replanned for the server or appropriate driver software may even have to be loaded. For accessing a device the server must known its network address. This must therefore be planned in or updated in the event of a change.

In the method according to the invention, however, access to the device is via a standardized interface of the completely unmodified device. This is made possible by sending a call from the first data processing device via a data network, e.g. the internet, to the second data processing device, with the call containing additional data in the form of an address of the relevant device. In the second data processing device this additional data is extracted from the data in the call and information of the device is accessed via the standardized interface of the device by means of the extracted address. The necessary additional information is provided not as planning data for the server but as part of the address of the server. URLs (Uniform Resource Locators) are used for addressing. The server can therefore create an HTML page of a PROFInet device, the address of which it does not receive until the request is made. A "page" is requested for example via http://hostx:5001/MiniCBA/hos, where "hostx" is the DNS name of the second data processing device in the form of a proxy server and "hosty" is the DNS name of the device.

The special feature of the invention is its use of a server that does not have to be project planned since the necessary additional information is contained in the addressing. This method makes use of the fact that the addressing and the access interface on OPC server or PROFInet devices are uniform. A new communication protocd (for example access via browsers by means of HTTP and HTML pages) can therefore be added without having to expand the devices or planning the above-mentioned server. In automation technology there is a need, particularly in the startup phase, to read/write data from/to the automation devices. This access should often be carried out from (client) devices that have no specific software installation (e.g. no vendor-specific planning software). The format of the response should be able to be freely determined by the client, e.g. an HTML page, a text file or an Excel spreadsheet. All these requests are triggered by the second data processing device receiving the variables to be requested from the device, replacing the parameters with the corresponding variables of the device in the file and transferring the file almost as an echo server to the first data processing device. In addition, access to this information can be made remotely, i.e. via internet access.

The invention is also based on the knowledge that in previous solutions plannable documents (HTML page, text file) had to be stored in the devices, in which in the event of a request the valid values are entered (only the read direction is described below, the write direction is similar). In this solution only the finished document types on the server can be requested by the client and there are restrictions on selecting the required variables.

In the solution according to the invention, however, a variable replacement algorithm is used, especially for ASCII documents. HTTP in particular is used for communication. A special feature of the invention is that the client can specify any document type and can specify any variables for replacement, whereas in the previous method these possibilities are typically preplanned on the server.

In the field of automation technology in particular, i.e. above all in production and process automation, there is the possibility of online service and support and an HMI interface for remote operation and monitoring, i.e. from a remote data processing device which itself does not have direct communication with the device.

A beneficial application of the invention is where the device is an automation device, in particular a Profinet device.

Because of the uniform interfaces of OPC servers and for example Profinet devices, the invention can be beneficially used in cases in which the standardized interface of the device is a COM and/or DCOM interface.

After the information of the device has been accessed, data output at the location of the request is made possible by the information being transferred from the device to the second data processing device and from there via the data network to the first data processing device.

Because of the coverage of the data networks, a particularly beneficial embodiment is where the internet and/or intranet is used as the data network and HTTP is used as the communication protocol. HTML and/or XML is then used to transfer the information to be requested from the device.

More precise control of the device can be achieved if the call for the device and/or the second data processing device contains certain additional parameters that are provided to control the content and/or output format of the information to be requested from the device. Further parameters can therefore be used to control the content and format. For example it is possible via http://hostx:5001/MiniCBA?Address=hosty&Hierarchy=3&IsXML=1 to specify that the third hierarchy stage of the PROFInet objects should be viewed and that the output format should be XML.

BRIEF DESCRIPTION OF THE DRAWINGS

The invention is described in further detail below on the basis of the embodiments presented in the following figures. The figures are as follows.

DETAILED DESCRIPTION OF INVENTION

Figure 1:
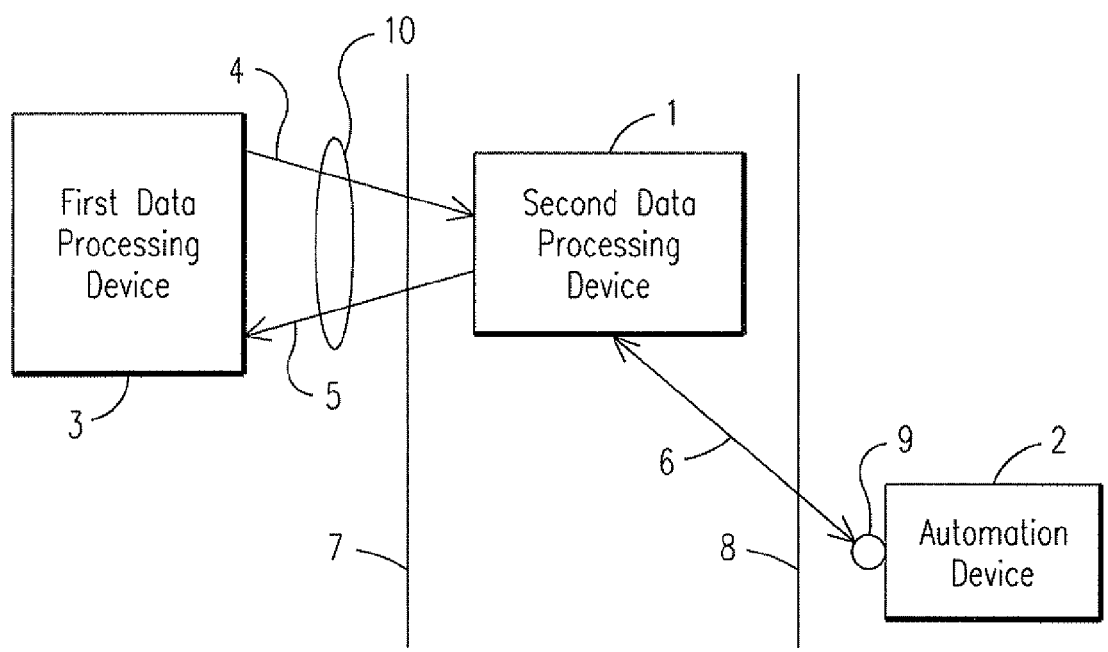
FIG. 1 is a block diagram of an embodiment of a system for accessing an automation device via its standardized interface.

FIG. 1 shows a block diagram of an embodiment of a system for accessing an automation device 2 via its standardized interface 9 from a first data processing device 3. The system shown in FIG. 1 consists essentially of a first data processing device 3, a second data processing device 1 and a device 2, in particular an automation device for a data network 10, for example the internet. A request 4 is sent from the first data processing device 3 to the second data processing device 1. A separating line 7 shows a possible computer boundary between the first data processing device 3 and the second data processing device 1. The call 4, which is sent to the second data processing device 1, contains an address that indicates the device 2. The second data processing device 1, for example a web server, extracts the address of the device 2 from the data of the call 4. Via a data connection 6, the second data processing device 1 accesses the extracted address of the device 2. Access is via a standardized interface 9 of the device 2.

Reference number 8 shows a possible computer boundary between the second data processing device 1 and the device 2.

The special feature of the system shown in FIG. 1 is that with the aid of address extraction in the second data processing device 1 it is possible to access information data of the device 2 from the first data processing device 3 even though direct access from the first data processing device 3 is not operation. This indirect data access is made possible by the fact that the address of the device 2 is contained in the call 4 and is extracted from the second data processing device 1. Return transfer of the information data requested via the standardized interface 9 via the data channel 6 takes place via the return channel 5 which again for example uses an internet data network 10.

Figure 2:
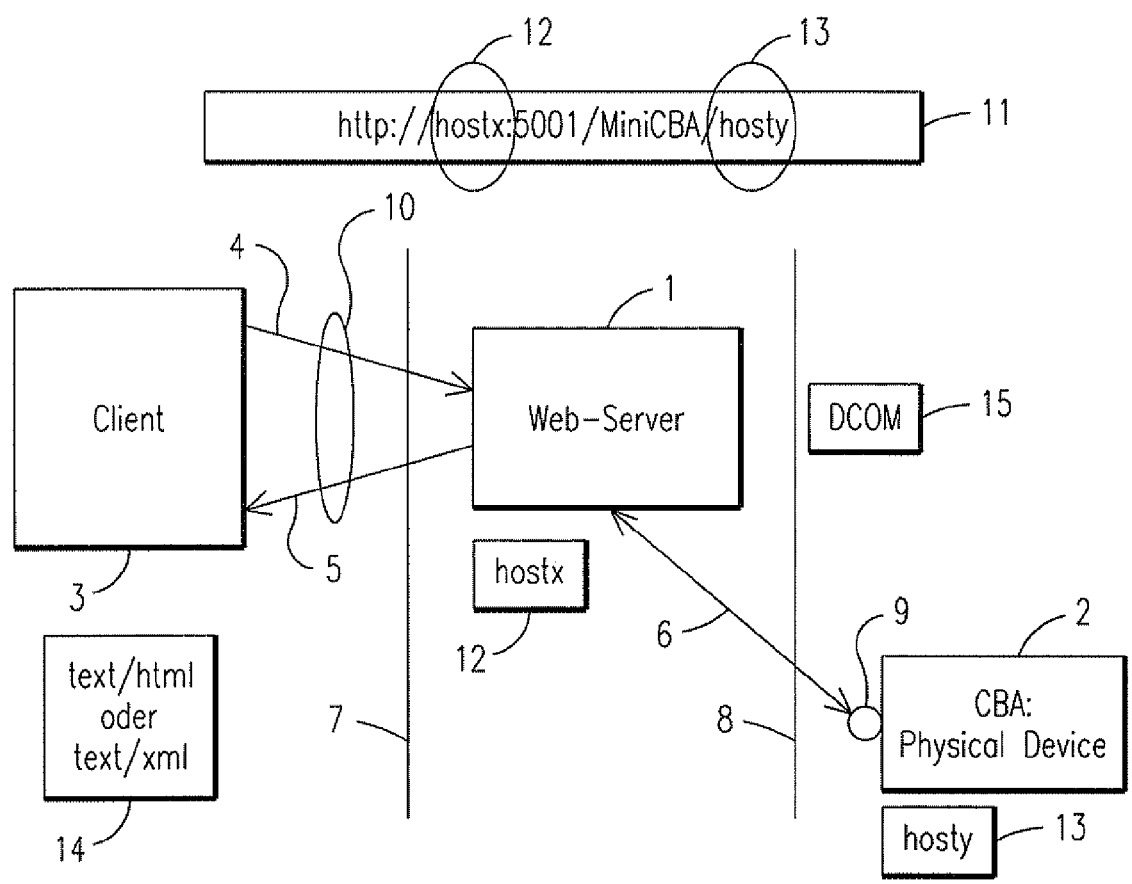
FIG. 2 is a schematic diagram of sample call data with address data to be extracted.

FIG. 2 shows a schematic diagram of sample call data 11 with address data 13 to be extracted for addressing a device via its standardized interface. FIG. 2 essentially contains the components already described in FIG. 1. In addition, FIG. 2 shows a call 11 which is formed from an internet address http://hostx:5001/MiniCBA/hosty. A first component 12 of this address, namely hostx, identifies the address of the second data processing device 1, which acts as a web server. A further component 13 of the address 11, namely hosty, identifies the address of the device 2. This further component 13 is extracted in the second data processing device 1 so that data access is enabled via the standardized interface 9 of the device 2. The requested data of the device 2 is returned via the data connection 6 to the second data processing device 1 and transferred from there in response data 5 to the first data processing device 3, for example as text or as an html file. In addition to incorporating the address data in the call 4 or in the address 11 it is also possible to incorporate further parameters which control the content of the output and/or the format. For example it is possible to specify that a certain hierarchy stage of the device 2 should be viewed first and that a certain output format is required.

In the example in FIG. 2 a client 3 accesses the server with the (DNS) address hostx via http://hostx:5001/MiniCBA/hosty. There the address of a PROFInet device is extracted from the URL (hosty) and the device is accessed via the interfaces specified by PROFInet by means of COM/DCOM.

The dotted lines in the figure show possible computer boundaries. The line on the right shows that the new communication protocol (here HTTP) and the production of the response (here HTML or XML) need not be integrated in the devices.

The structure of the URL is given here only as an example. It would also be possible to use http://hostx:5001/MiniCBA?Address=hosty or similar just as well.

Figure 3:
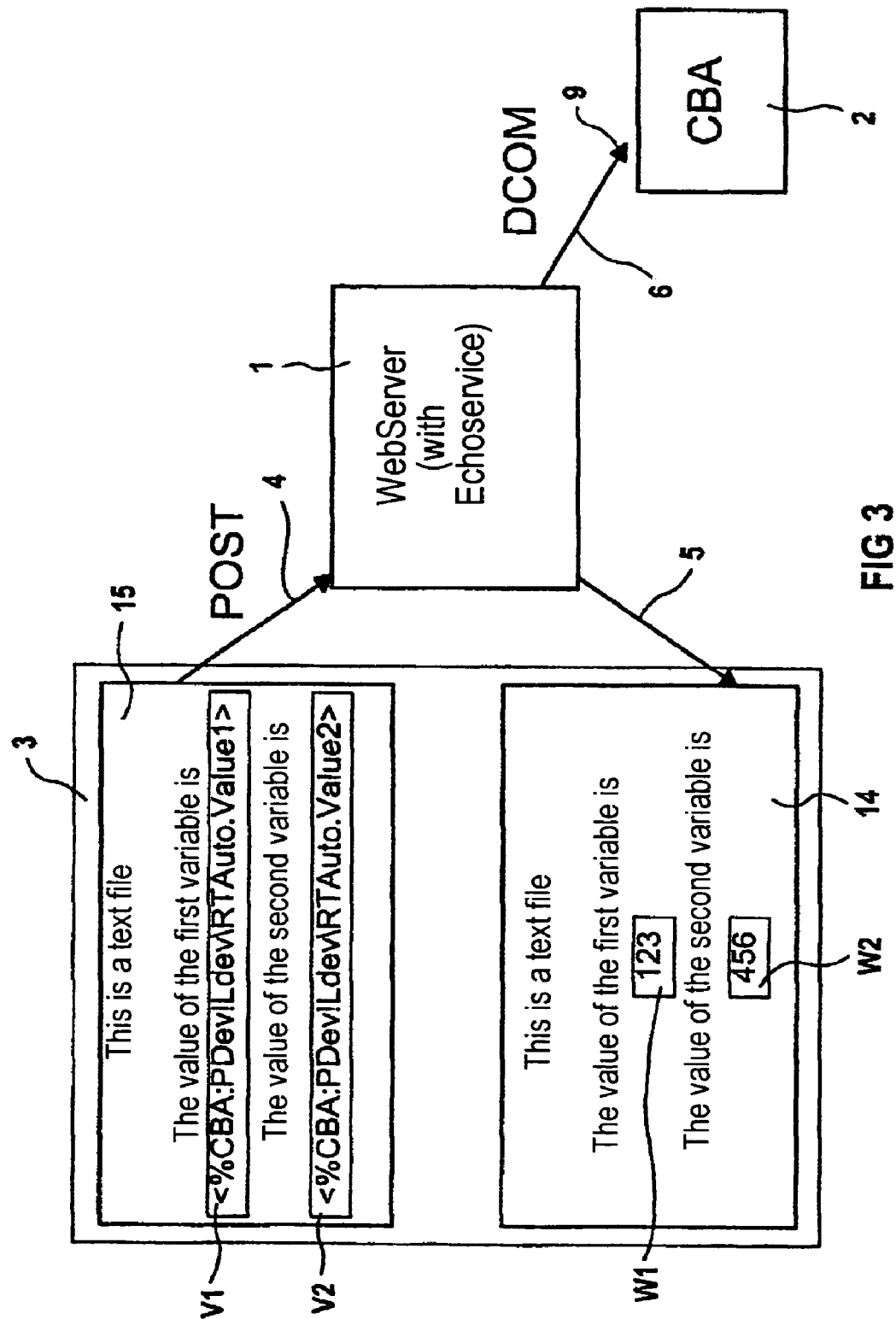
FIG. 3 is a schematic diagram of a data request from an automation device via an echo server and FIG. 4 is a graphical user interface for a data request from an automation device via an echo server.

FIG. 3 shows a schematic diagram of a data request from an automation device 2 via an echo server 1. The reference numbers used in connection with FIG. 1 and FIG. 2 also apply here. In the symbolic block 3 of the first data processing device a symbolic text file 15 is shown which in addition to text contains variables V1, V2. This text file 15 is transferred by means of a call 4 to the second data processing device 1, known as the web server with echo service. The echo server 1 first accesses the device 2 via a data connection 9 and determines the variable values V1, V2 to be requested, i.e. corresponding values W1, W2, which are assigned to variables V1, V2, are returned via the standardized interface 9 to the web server 1. The web server 1 enters these values W1, W2 in the text file 15 and returns a resultant text file 14 containing the values W1=123 and W2=456 to the first data processing device 3. Overall, this provides access from the first data processing device 3, for example a client, to an automation device 2 without the need for any change on the device itself or costly additional planning.

FIG. 3 shows a schematic diagram of a data request from an automation device 3 via an echo server 1. In the following embodiment a text file is sent by HTTP-POST to a web server. This forwards the file to the echo service. This scans the file for variables to be replaced (the syntax here is by way of an example only). For each variable to be replaced it fetches the current value (in the embodiment for PROFInet devices via DCOM) and replaces it in the file, which is then returned to the client.

Figure 4:
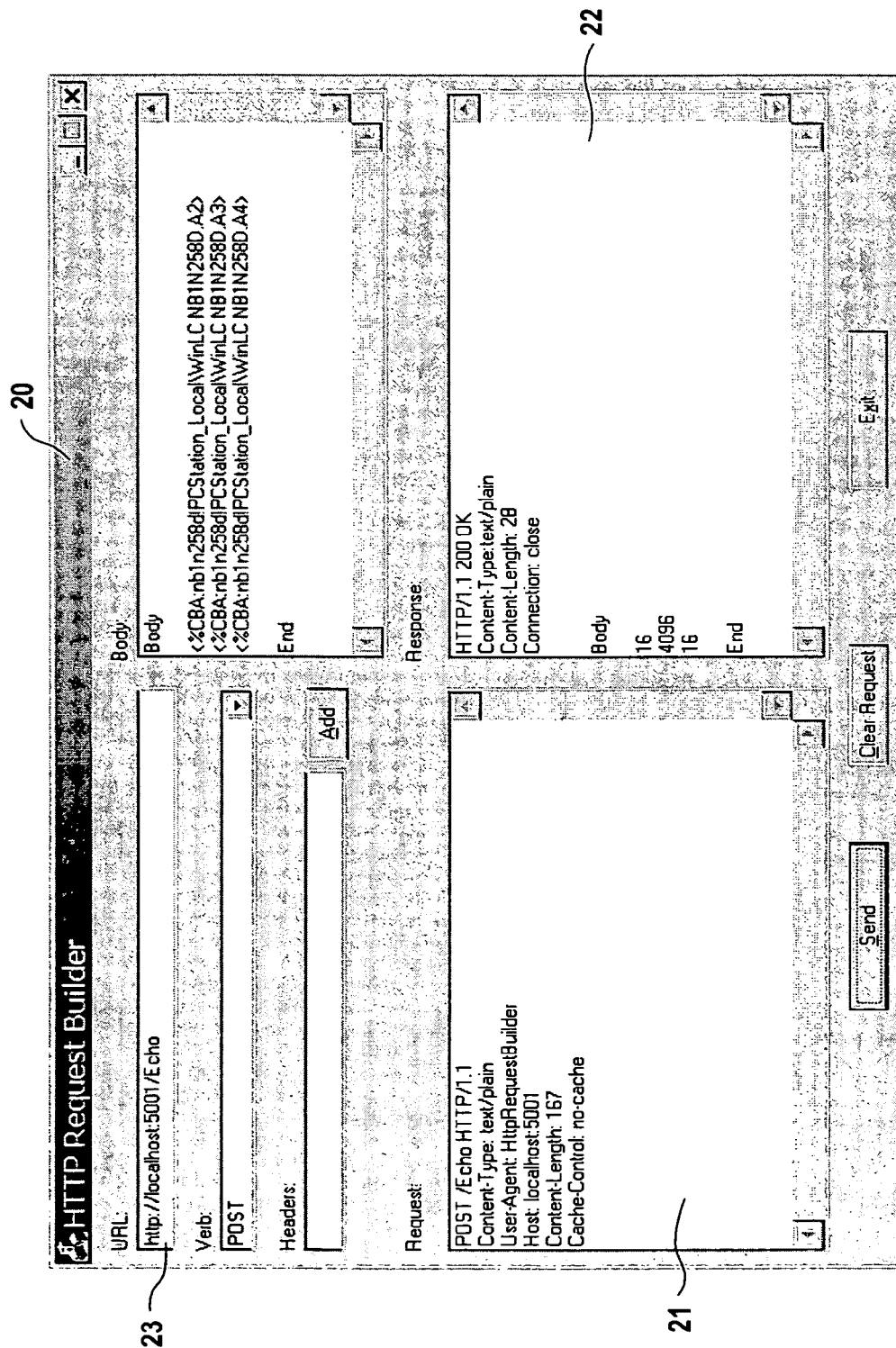

FIG. 4 shows a sample graphical user interface 25 for a data request from an automation device via an echo server. The user interface consists of individual screen areas, including a first screen area 21 for identifying request information, a second screen area 22 containing the response information including the extracted variables of the automation device, and a third screen area 23 for identifying the call address. Such a user interface represents a possible client application for implementing the method according to the invention.

In summary, the invention relates to a system and method for the data output of a device, in particular an automation device via its standardized interface. It is proposed to achieve access to data and output of the data of the devices 2 from a data processing device 3 via a data network by sending a call 4 from a first data processing device 3 via a data network to a second data processing device 1. The call contains an address of the device and a file with the assignable variables of the device. In the second data processing device 1 the address 10 for identifying the device 2 is extracted and the information of the device 2 is accessed via the standardized interface 9 of the device 2 by means of the address extracted in the second data processing device 1. The second data processing device receives the variables to be requested, replaces the parameters in the file with the corresponding variables of the device and transfers the file almost as an echo server to the first data processing device.

The invention claimed is:

1. A method for accessing an automation appliance device having a standardized interface comprising:

configuring a user interface coupled to a first data processing device, the user interface comprising a first screen area, a second screen area and a third screen area;

sending a call from the first data processing device via a data network to a second data processing device, wherein the call contains an address for identifying the second data processing device, and wherein the call further contains an address for identifying the automation appliance device and a file with variables of the automation appliance device to be requested;

in the second data processing device, extracting the address of the automation appliance device contained in the data of the call from the first data processing device to the second data processing device for identifying the automation appliance device;

accessing information of the of the automation appliance device via the standardized interface of the automation appliance device by the address extracted in the second data processing device;

in the second data processing device, replacing the variables contained in the file with values transferred from the automation appliance device; and sending the file with the values to the first data processing device, wherein the configuring of the user interface comprises:

identifying in the first screen area the variables of the automation appliance device to be requested;

displaying in the second screen area the values transferred from the automation appliance device; and identifying in the third screen area the address of the automation appliance device.

2. The method according to claim 1, wherein a data format for the file is freely selected by the first data processing device.

3. The method according to claim 1, wherein after the information of the automation appliance device has been accessed the information is transferred from the automation appliance device to the second data processing device and from there via the data network to the first data processing device.

4. The method according to claim 1, wherein the internet and/or intranet is used as the data network.

5. The method according to claim 1, wherein HTML and/or XML is used for transferring the information, to be requested from the device.

6. The method according to one of claim 1, wherein the call for the automation appliance device and/or the second data processing device comprises additional parameters for controlling the content and/or format of the output of the information to be requested from the automation appliance device.

7. A system for accessing an automation appliance device having a standardized interface comprising:

a first data processing device for sending a call via a data network to a second data processing device, wherein the call comprises an address for identifying the second data processing device, and wherein the call further contains an address for identifying the automation appliance device and a file with variables of the automation appliance device to be requested, wherein the first data processing is coupled to a user interface comprising a first screen area, a second screen area and a third screen area;

extraction facilities contained in the second data processing device for extracting the address contained in the data of the call of the first data processing device to the second data processing device for identifying the automation appliance device;

access facilities for accessing information of the device via the standardized interface of the automation appliance device by the address extracted in the second data processing device;

mechanisms contained in the second data processing device for replacing the variables contained in the file with values transferred from the automation appliance device; and sending facilities contained in the second data processing device for sending the file with the values to the first data processing device, wherein the user interface is configured to identify in the first screen area the variables of the automation appliance device to be requested, to display in the second screen are the values transferred from the automation appliance device, and to identify in the third screen area the address of the automation appliance device.

8. The system according to claim 7, wherein a data format for the file can be freely selected by the first data processing device.

9. The system according to claim 7, wherein after the information of the automation appliance device has been accessed the information is transferred from the automation appliance device to the second data processing device and from there via the data network to the first data processing device.

10. The system according to claim 7, wherein the internet and/or intranet is used as the data network.

11. The system according to claim 7, wherein HTML and/or XML is used for transferring the information to be requested from the automation appliance device.

12. The system according to one of claim 7, wherein the call for the automation appliance device and/or the second data processing device comprises additional parameters for controlling the content and/or format of the output of the information to be requested from the automation appliance device.

13. A computer-readable storage medium containing computer program instructions for accessing an automation appliance device having a standardized interface, the computer-readable storage medium comprising:
   computer-readable code for sending a call from a first data processing device via a data network to a second data processing device, wherein the call contains an address for identifying the second data processing device, and wherein the call further contains an address for identifying the automation appliance device and a file with variables of the automation appliance device to be requested, wherein the first data processing is coupled to a user interface comprising a first screen area, a second screen area and a third screen area;
   in the second data processing device, computer-readable code for extracting the address contained in the data of the call from the first data processing device to the second data processing device for identifying the automation appliance device;
   computer-readable code for accessing information of the automation appliance device via the standardized interface of the automation appliance device by the address extracted in the second data processing device;
   in the second data processing device, computer-readable code for replacing the variables contained in the file with values transferred from the automation appliance device; and
   computer-readable code for sending the file with the values to the first data processing device, wherein the user interface comprises computer readable code for configuring a first screen area, a second screen area and a third screen area, and further wherein the computer readable code for configuring the screens comprises:
   computer-readable code for identifying in the first screen area the variables of the automation appliance device to be requested;
   computer-readable code for displaying in the second screen are the values transferred from the automation appliance device; and
   computer-readable code for identifying in the third screen area the address of the automation appliance device.

14. The method according to claim 1, wherein a data format for the file is HTML, a spreadsheet and/or a text format.

15. The method according to claim 1, wherein the automation appliance device is a Profinet device.

16. The method according to claim 1, wherein the standardized interface of the automation appliance device is a COM and/or DCOM interface.

17. The method according to claim 1, wherein HTTP is used as a communication protocol.

18. The system according to claim 7, wherein a data format for the file is HTML, an Excel spreadsheet and/or a text format.

19. The system according to claim 7, wherein the automation appliance device is a Profinet device.

20. The system according to claim 7, wherein the standardized interface of the device is a COM and/or DCOM interface.

21. The system according to claim 7, wherein HTTP is used as a communication protocol.

* * * * *